(12) United States Patent
Karg

(10) Patent No.: US 10,682,940 B2
(45) Date of Patent: Jun. 16, 2020

(54) AGRICULTURAL DUMP CART

(71) Applicant: Brian D. Karg, Harbor Beach, MI (US)

(72) Inventor: Brian D. Karg, Harbor Beach, MI (US)

( * ) Notice: Subject to any disclaimer, the term of this patent is extended or adjusted under 35 U.S.C. 154(b) by 112 days.

(21) Appl. No.: 15/936,848

(22) Filed: Mar. 27, 2018

(65) Prior Publication Data

US 2018/0272912 A1 Sep. 27, 2018

Related U.S. Application Data

(60) Provisional application No. 62/477,028, filed on Mar. 27, 2017.

(51) Int. Cl.
| | | |
|---|---|---|
| *B60P 1/16* | (2006.01) | |
| *A01D 87/00* | (2006.01) | |
| *B60P 1/28* | (2006.01) | |

(52) U.S. Cl.
CPC .......... *B60P 1/165* (2013.01); *A01D 87/0038* (2013.01); *B60P 1/28* (2013.01)

(58) Field of Classification Search
CPC .... B60P 1/165; B60P 1/56; B60P 1/26; B60P 1/38; B60P 1/28
USPC ......... 298/18, 17.6, 35 R, 5–7, 2, 10–11, 31, 298/35 M; 414/470, 502, 528, 507, 808, 414/491
See application file for complete search history.

(56) References Cited

U.S. PATENT DOCUMENTS

| | | | |
|---|---|---|---|
| 2,848,275 A | 8/1958 | Armington | |
| 4,068,891 A | 1/1978 | Herbst | |
| 4,371,208 A | 2/1983 | Stricker | |
| 4,430,038 A | 2/1984 | Rempel et al. | |
| 4,494,798 A | 1/1985 | Bailey | |
| 4,953,744 A | 9/1990 | Koyama | |
| 5,021,156 A * | 6/1991 | Sloan ................. | B01D 21/2444 210/241 |
| 5,407,390 A * | 4/1995 | Carney ................ | A01D 46/082 298/1 B |
| 5,431,481 A | 7/1995 | Boyer | |
| 5,449,224 A | 9/1995 | Johnson | |
| 5,480,214 A | 1/1996 | Rogers | |
| 5,597,211 A | 1/1997 | Golden | |
| 5,845,971 A | 12/1998 | Rogers | |
| 5,906,417 A | 5/1999 | Golden | |
| 6,386,818 B1 | 5/2002 | Reed | |
| 6,508,419 B1 | 1/2003 | Kinkead et al. | |
| 6,536,846 B1 | 3/2003 | Felty | |
| 6,796,615 B1 | 9/2004 | Clark | |
| 6,929,329 B2 * | 8/2005 | Kent ........................ | B60P 1/26 298/23 R |
| 6,957,868 B1 | 10/2005 | Clark | |

(Continued)

*Primary Examiner* — D Glen Dayoan
*Assistant Examiner* — Sunsurraye Westbrook
(74) *Attorney, Agent, or Firm* — Taylor IP, P.C.

(57) ABSTRACT

An agricultural dump cart including a frame, ground conveyance devices carrying the frame, a dump bed, a dumping mechanism and at least one live wall mechanism. The dump bed is coupled to and carried by the frame, and the dump bed has a non-dumping position and a dumping position. The dumping mechanism is connected to the dump bed, and is configured to move the dump bed between the non-dumping position and the dumping position. The at least one live wall mechanism is operatively located along a side of the dump bed, and is generally horizontal when the dump bed is in the dumping position.

18 Claims, 6 Drawing Sheets

(56) References Cited

U.S. PATENT DOCUMENTS

| | | | |
|---|---|---|---|
| 7,641,285 B2 * | 1/2010 | Jacobs | B62D 33/0625 |
| | | | 298/1 C |
| 8,454,095 B1 * | 6/2013 | Dilts | B60P 1/003 |
| | | | 298/1 B |
| 8,562,278 B2 | 10/2013 | Johnson et al. | |
| 9,580,875 B1 * | 2/2017 | D'Ascanio | E01C 19/48 |
| 9,809,263 B2 * | 11/2017 | Mitchell | B62D 51/008 |

\* cited by examiner

AGRICULTURAL DUMP CART

CROSS REFERENCE TO RELATED APPLICATIONS

This is a non-provisional application based upon U.S. provisional patent application Ser. No. 62/477,028, entitled "DUMP CART WITH LIVE WALL FLOOR", filed Mar. 27, 2017, which is incorporated herein by reference.

BACKGROUND OF THE INVENTION

1. Field of the Invention

The present invention relates to agricultural crop material hauling devices, and, more particularly, to agricultural dump carts.

2. Description of the Related Art

Dump carts are well-known and commercialized, especially in the farming community. The dump carts, which may be towed by a vehicle such as a tractor, are often used in fields that are soft and muddy that require transfer trucks to stay at field ends and driveways. The carts are filled by a harvester in the field, then transported to the waiting transfer truck where the product being harvested is transferred into the transfer truck. Time is of the essence in harvesting some farm crops and it would be to the advantage of the farmer if he could more quickly harvest a certain crop and get it transferred to transfer vehicles.

One expeditious method for transferring crops from a harvester is to provide transfer of the crop from the harvester to a dump cart and then from the dump cart to a transfer truck. With prior art dump carts, it takes extra time to transfer the crop from the dump cart to a transfer truck, and it is very difficult to fill a transfer truck without spilling or overloading. Due to the challenges of filling transfer trucks completely, without spillage, many farmers use auger-type grain carts to transfer grain crops; however, they are slower to unload, and can damage grain resulting in deductions when sold. Auger-type carts can only be used for grain crops, thus requiring multiple type of carts if forage and root type of crops are harvested.

Dump carts of prior art, by design, have been limited in size and capacity which require two cart loads to fill most transfer trucks. The design of the invention has allowed for the capacity to be such that one cart load will fill most transfer trucks. Half as many trips from the harvester to the transfer trucks reduces labor and equipment costs because One cart and tractor can do the work of two. Fewer trips up and down the fields will also reduce compaction on the soil in the field which can help the subsequent crops.

Side dump trailers/carts are well known implements used in construction and agriculture. Some examples of side dump trailers, for transporting and dumping materials are shown in the following patents.

In U.S. Pat. No. 2,848,275, Armington describes a frameless side dump trailer, having a cart type body with a draw bar for attachment to a tractor and a rear extension member mounted to the rear wheels. The body is supported on each end by pairs of interlocking brackets with each bracket rotatably connected to the lower supporting parts. The trailer body is emptied by attaching a hoist or crane to the middle of one side of the body using a chain, and elevating the connected side with the hoist or crane. The rotational pins are permanently connected to the brackets and supports.

Rempel et al., in U.S. Pat. No. 4,430,038, disclose a power dump wagon with a conventional four-wheeled chassis with a triangular support frame (FIG. 4), holding a wagon box (FIG. 5). The box is pivotally fastened at one side to the triangular support frame at about $2/3$ the height of the box. A piston and cylinder assembly is fastened between one edge of the chassis and near the center line of the box, at about $2/3$ the box height. Extending the cylinder assembly pivots and empties the box. A conveyor in one side of the box assists in emptying the contents of the box. The box pivots only to one side of the chassis.

Bailey, in U.S. Pat. No. 4,494,798, discloses a dual side-dumping tractor and trailer assembly having a container bed supported on front and rear bunk assemblies. Hydraulic cylinders are fastened between each bunk assembly and one upper end of the container bed. The bunk assemblies are rotatably mounted to the trailer chassis (FIG. 7). Releasable hinge-mounted assemblies are positioned at each end of the bunks and are operated by cables. Releasing the hinges on one side of the trailer and extending the hydraulic cylinders dumps the contents of the container bed 10 (FIG. 5).

U.S. Pat. No. 5,431,481 by Boyer shows a side dumping trailer with a hopper box on a frame of a tractor-trailer. The box has side gates operated by hydraulic or pneumatic cylinders, that control the opening of side doors of the hopper box, thus allowing dumping of the box contents to either side of the hopper box.

In U.S. Pat. No. 5,480,214, Rogers describes a side dump trailer pulled by a truck having a fifth wheel. The trailer body is supported at the corners on rocker pin assemblies (FIG. 6). One of a pair of hydraulic cylinders is mounted at the top edge of each end of the trailer body and to the frame. Releasing the two rocker pin assemblies on one side of the trailer and extending the hydraulic cylinders, tilts the body to the opposite side and empties the trailer contents.

Golden, in U.S. Pat. No. 5,597,211, discloses a bidirectional side dump trailer with pivot connectors and supporting the trailer box. An elevating assembly beneath the box has two power cylinders with a lever between them to elevate and pivot the box to empty the contents.

In U.S. Pat. No. 5,845,971, Rogers describes another side dump trailer pulled by a truck having a fifth wheel. The trailer body is supported along both sides by supports that mate with other supports (FIG. 4). The first supports are rotatably attached in a permanent configuration, while other supports are releasably attached. A number of power cylinders are fastened between the frame and the bottom of the body which has the releasable supports. Extending the power cylinders with the supports detached rotates and tilts the body to empty the contents to one side of the trailer only.

Golden, in U.S. Pat. No. 5,906,417, discloses yet another bidirectional side dump trailer with hydraulically operated pivot connectors and with either a power cylinder below the box (FIG. 2) or with power cylinders at each end of the box (FIG. 11).

What is needed in the art is a dump cart with enhanced dumping capabilities to reduce spillage and damage to the crops during crop transfer operations.

SUMMARY OF THE INVENTION

The present invention provides a side dumping cart with a live wall mechanism.

The invention in one form is directed to an agricultural dump cart including a frame, ground conveyance devices carrying the frame, a dump bed, a dumping mechanism and at least one live wall mechanism. The dump bed is coupled to and carried by the frame, and the dump bed has a non-dumping position and a dumping position. The dumping mechanism is connected to the dump bed, and is configured to move the dump bed between the non-dumping position and the dumping position. The at least one live wall mechanism is operatively located along a side of the dump bed, and is generally horizontal when the dump bed is in the dumping position.

The invention in another form is directed to a dump bed used by a dump cart having a frame, and ground conveyance devices carrying the frame. The dump bed has a dumping mechanism and at least one live wall mechanism. The dump bed is coupled to and carried by the frame, and the dump bed has a non-dumping position and a dumping position. The dumping mechanism is connected to the dump bed, and is configured to move the dump bed between the non-dumping position and the dumping position. The at least one live wall mechanism is operatively located along a side of the dump bed, and is generally horizontal when the dump bed is in the dumping position.

An advantage of the present invention is that the dump cart transfers crops from the dump cart to the transfer truck in a matter of seconds.

Another advantage is the live walls along with the baffle maintains an even distribution of the crops during the transfer action of the cart.

Yet another advantage is the weight balance in the transfer truck is maintained.

Still yet another advantage of the present invention is that it reduces or eliminates crop loss due to spillage during the transfer to a receiving vehicle.

Yet another advantage is that one cart can convey grain, root crops and forages, rather than requiring multiple types of carts.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
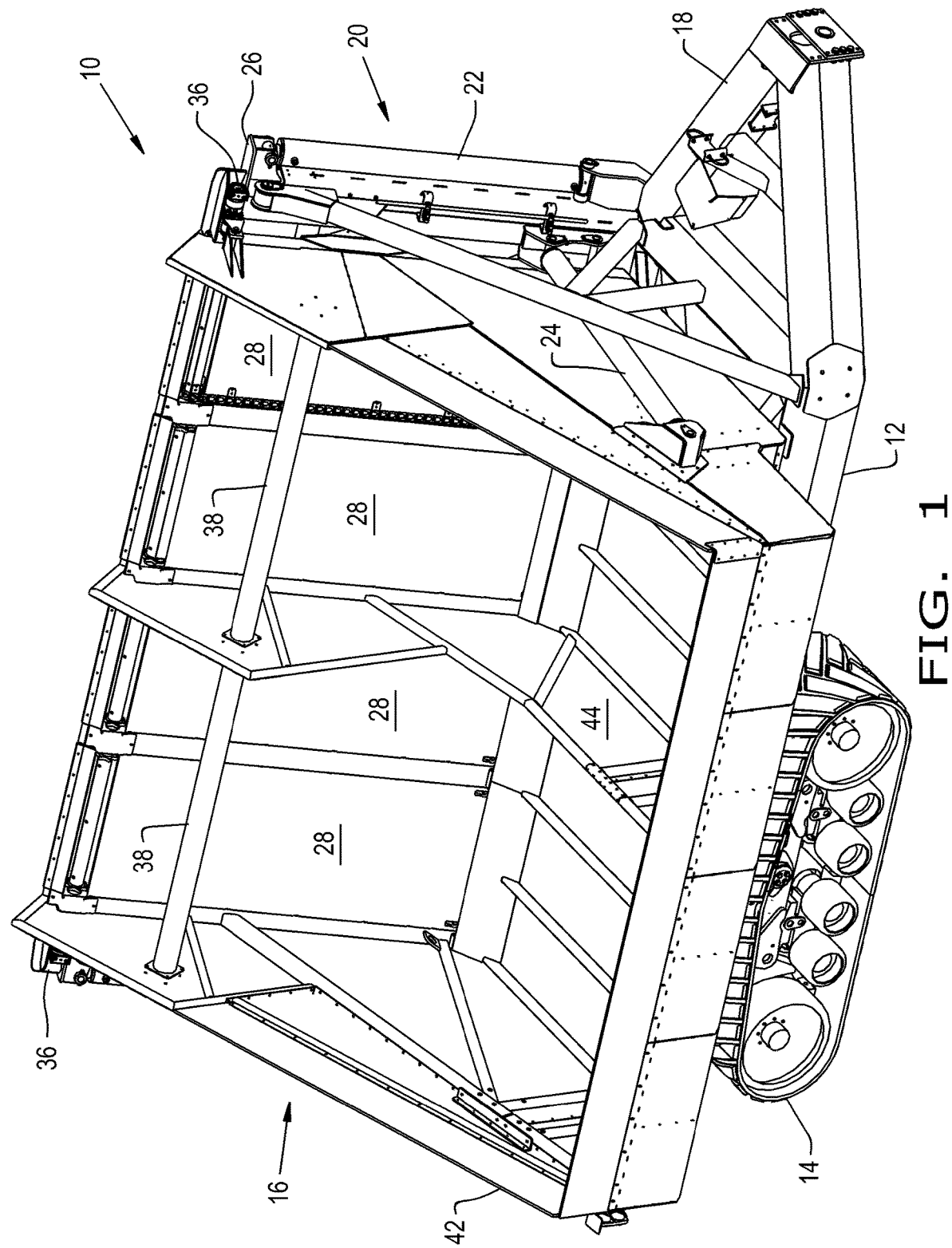
FIG. 1 is a perspective view of an embodiment of an agricultural vehicle in the form of a dump cart according to the present invention with a dump bed in a non-dumping position.
Figure 2:
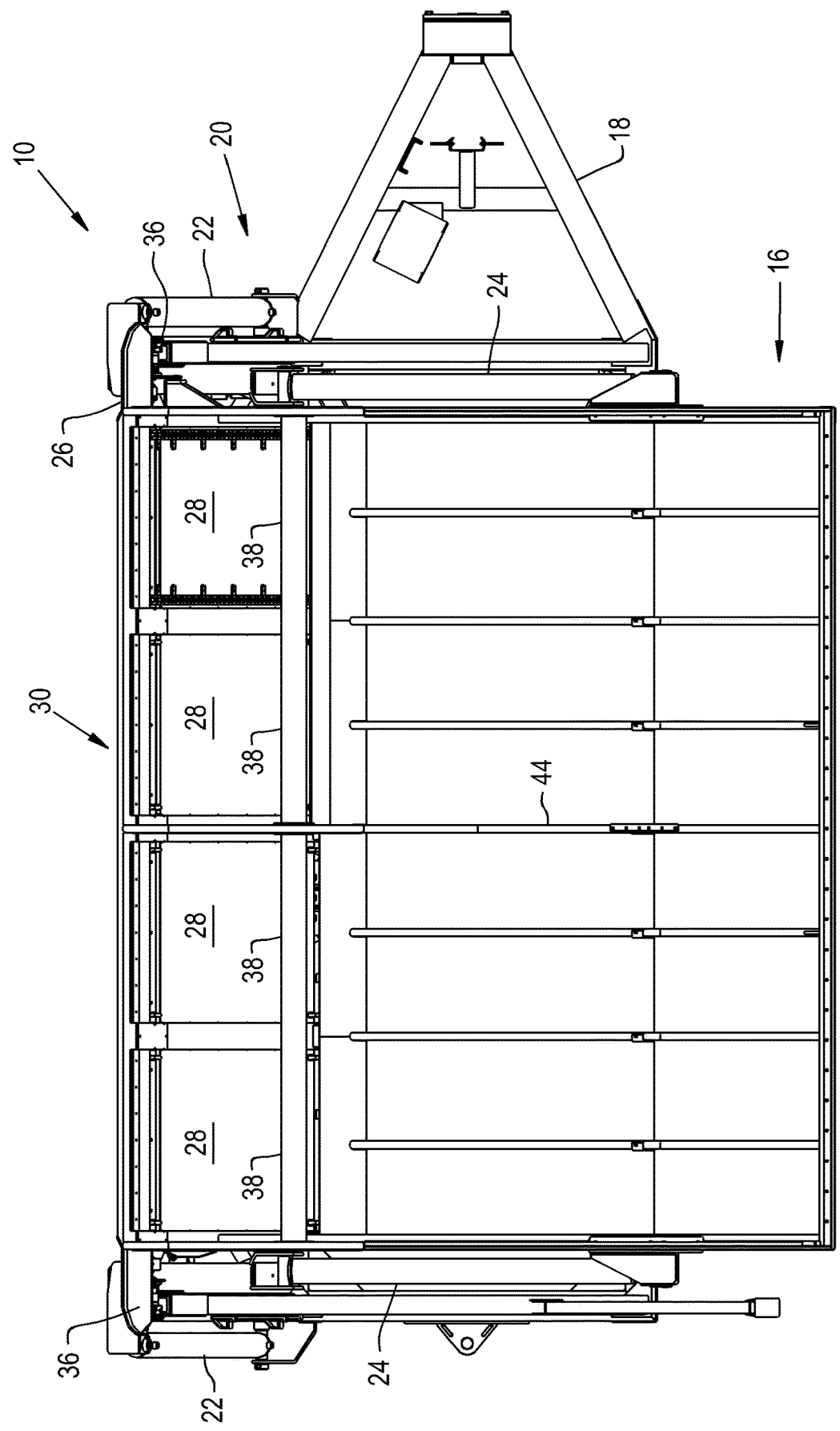
FIG. 2 is a top view of the dump cart shown in FIG. 1 with the dump bed in the non-dumping position.

Referring now to the drawings, and more particularly to FIGS. 1-6, there is shown an agricultural dump cart 10 including a frame 12 carried by ground conveyance devices 14, with a dump bed 16 coupled to and carried by frame 12. Dump cart 10 also includes a tongue 18. Dump bed 16 has a non-dumping position (seen in FIG. 1) and a dumping position (illustrated in FIG. 6). Ground conveyance devices 14 may be in the form of wheels or tracks 14 with tracks 14 being illustrated in the drawings.

There is a dumping mechanism 20 that is connected to dump bed 16, and is configured to move dump bed 16 between the non-dumping position and the dumping position. Dumping mechanism 20 includes lifting hydraulic actuators 22, tilting hydraulic actuators 24 and framework 26. Dumping mechanism 20 is activated by an operator causing dump bed 16 to elevate from frame 12 as it follows framework 26, then when dump bed 16 is elevated tilting hydraulic actuators 24 are activated causing dump bed 16 to tilt to the side of cart 10.

Dump bed 16 has at least one live wall mechanism 28 operatively located along a side 30 of dump bed 16. The live wall mechanism 28 is generally horizontal when the dump bed 16 is in the dumping position (see FIGS. 5 and 6). Live wall mechanism 28 includes slats 32 and chains 34 that are coupled together to allow crop material CM that lies thereon to be discharged from dump cart 10 by the movement of slats 32 and chains 34 when live wall mechanism 28 is generally horizontal. Generally horizontal is to be understood to be more horizontal than vertical and includes tilted so that crop material CM can be dumped from dump cart 10. Crop material CM on slats 32 move together with slats 32 as the crop material CM is transferred from dump bed 16. Each live wall mechanism 28 has at least one chain 34 that runs along both sides of side 30 and tie slats 32 together. A drive mechanism 36, which can be a hydraulic motor 36, or an electric motor 36, or the like, is coupled to chains 34 to thereby selectively drive chains 34. It is contemplated that chains 34 can freewheel to allow slats 32 and chains 34 to move without being driven by drive mechanism 36. In the illustrated exemplary embodiment, four live wall mechanisms 28 are shown with two drive mechanisms 36, each of which can drive two of the four live wall mechanisms 28. Live wall mechanism 28 is referred to throughout even though when dump bed 16 is in a dumping position wall 28 is functioning as a floor with considerable weight from the crop material CM thereon. The continued reference to live wall mechanism 28 as a wall is intentional for the sake of clarity.

Live wall mechanisms 28 are positioned beside each other along side 30 of dump bed 16, with each of the live wall mechanisms 28 being configured to move independent of each other. For example, as crop material CM is being transferred from dump bed 16 in the dumping position live wall mechanism 28 is configured to keep moving when the crop material CM in a receiving vehicle RV reaches a level comparable with the live wall mechanism 28 and the crop material CM stops flowing. An adjacent live wall mechanism 28 is configured to allow continued movement of crop material CM while the movement of crop material CM is stopped on the other live wall mechanism 28. It is also contemplated that live wall mechanism 28 could stop when the crop material CM level is reached, either by a clutching mechanism or as a result of a sensor that senses the fill level in the receiving vehicle RV.

Figure 3:
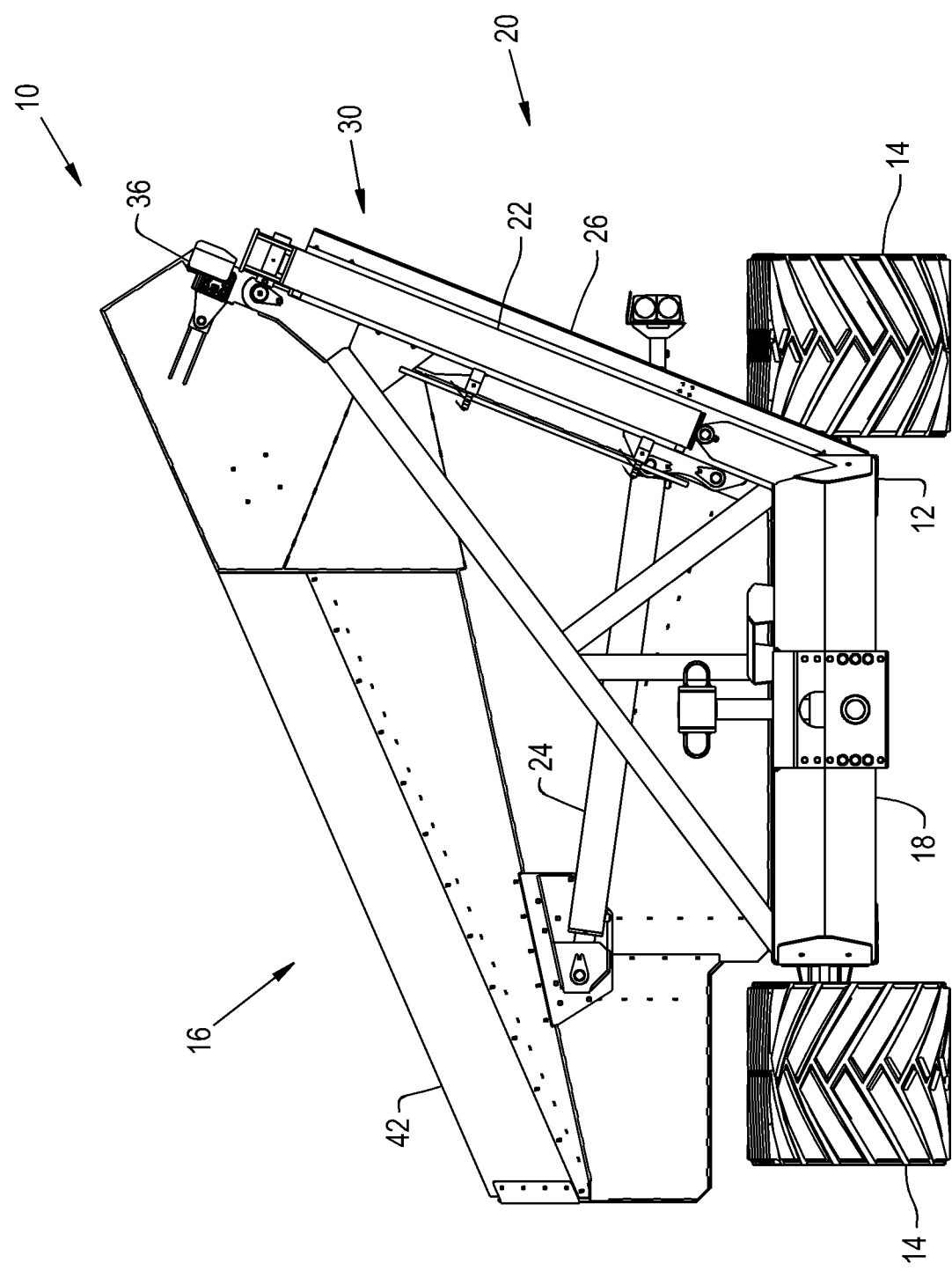
FIG. 3 is a front view of the dump cart shown in FIGS. 1-2 with the dump bed in a non-dumping position.

As can be seen, particularly in FIG. 3, side 30 and hence live wall mechanism 28 is angled outwardly relative to dump bed 16 when dump bed 16 is in the non-dumping position. In the dumping position live wall 28 is generally horizontal, and tipped toward receiving vehicle RV.

Dump bed 16 additionally has a baffle 38 positioned above live wall mechanism 28 as can be seen in FIGS. 1, 2, 5 and 6, with baffle 38 running substantially an entire length of dump bed 16. Baffle 38 runs generally parallel with a bottom 40 of dump bed 16. Baffle 38 serves to control the flow of crop material CM as dump bed 16 is transferring crop material CM by controlling the level of the crop material reaching the edge of the live wall mechanism 28. It is also contemplated that baffle 38 can be removed, repositioned and be rotationally attached.

Additionally a resilient yet stiff side member 42 is coupled to a top edge of dump bed 16. Member 42 may be made of a woven material that is impregnated with a resilient material such as a synthetic rubber. Member 42 serves to hold crop material CM in dump bed 16, yet is forgiving to the surface of a feed mechanism (not shown) that is filling cart 10 in the field, in the event the feed mechanism should encounter member 42.

Side member 42, which can be considered a flexible extension 42, runs along the fill side of dump cart 10 allowing for the harvester boom to run very low and close to bottom 40 of cart 10 giving product CM a short drop. This allows the harvester to unload faster with minimal crop breakage upon starting the fill of an empty cart 10.

Figure 4:
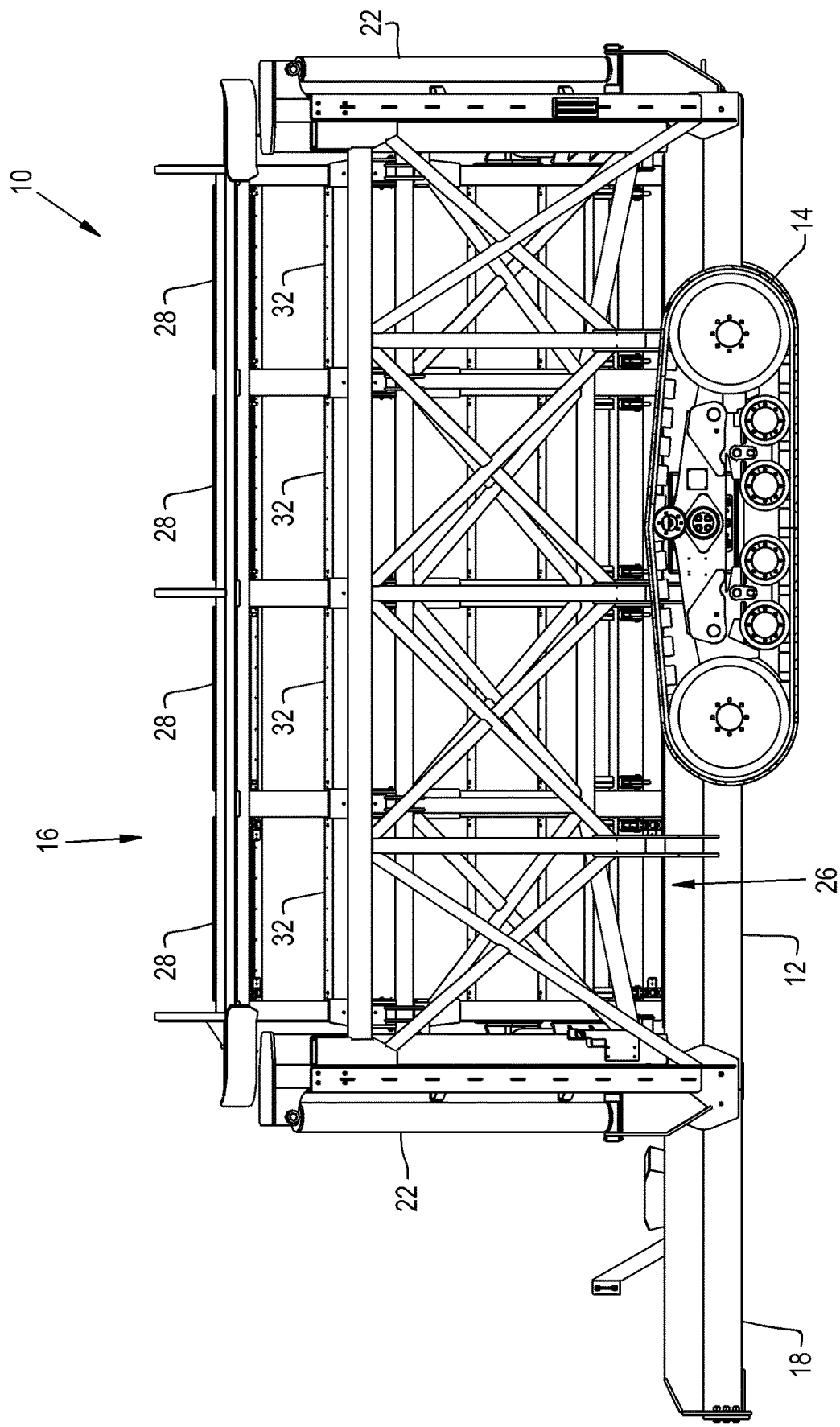
FIG. 4 is a side view of the dump cart shown in FIGS. 1-3 with the dump bed in the non-dumping position.

FIG. 4 is a side view of cart 10. It should be understood that the X-bracing 26, creates a "truss effect" transferring some of the weight from the ends of the cross braced X frame 26, inward to tracks 14. This increases stability and reduces the deflection of carrying frame 12, which allows for a much longer and higher load capacity than prior art dump carts.

Figure 5:
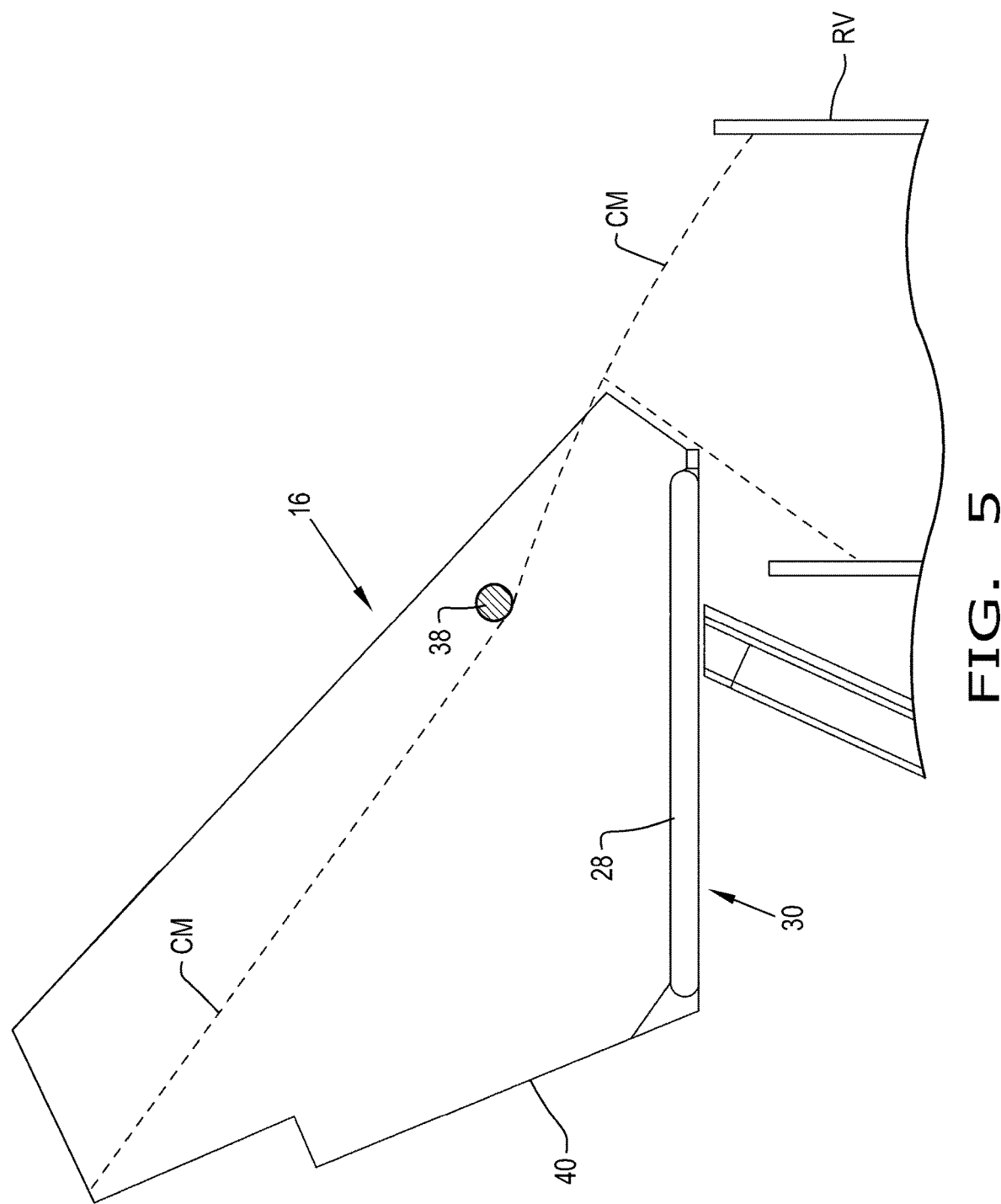
FIG. 5 is a schematized view of the dump cart of FIGS. 1-4 with the dump bed in a raised dumping position.
Figure 6:
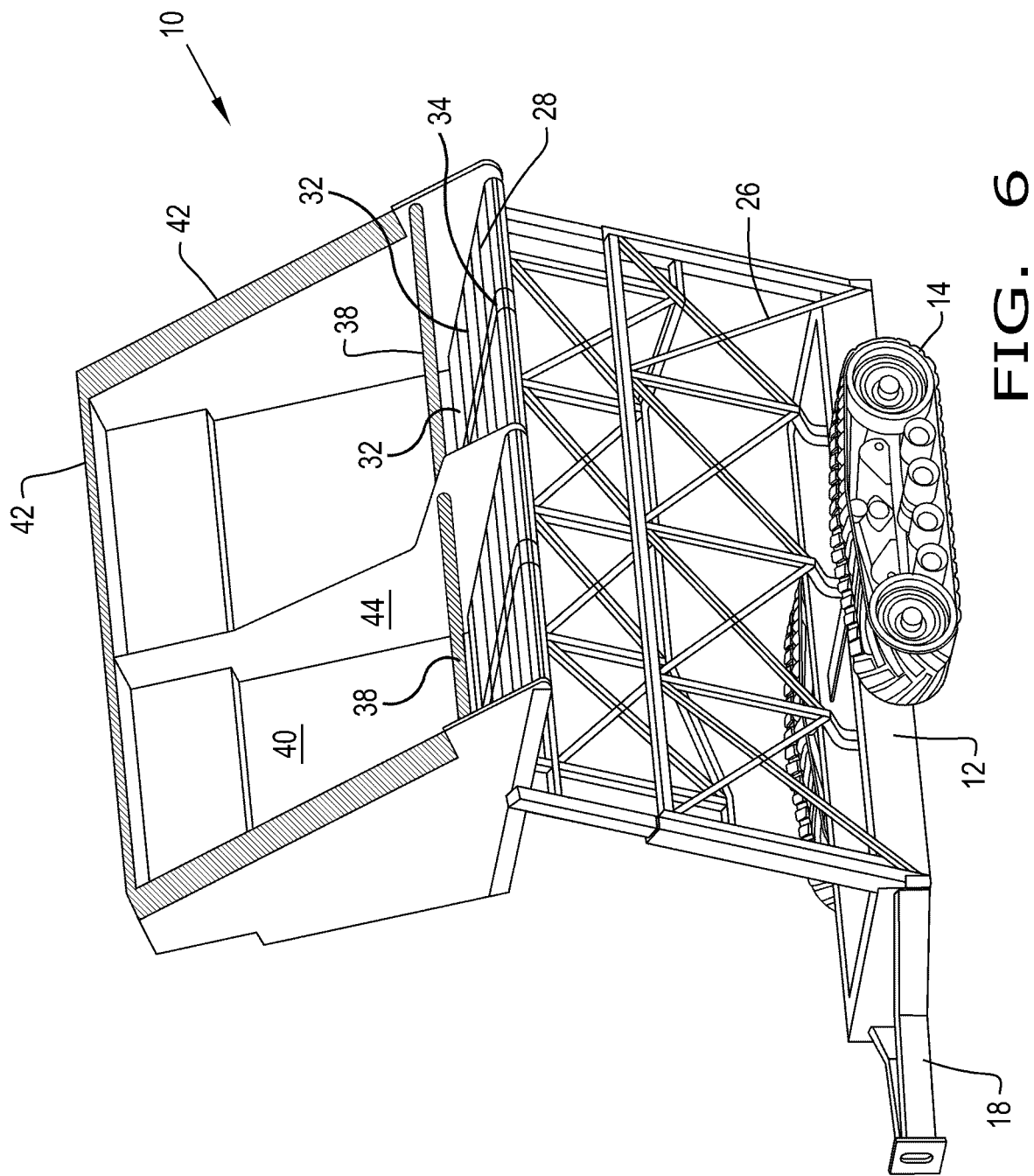
FIG. 6 is a perspective view of the dump cart of FIGS. 1-5 with the dump bed in a raised dumping position.

FIG. 5 is a partial schematized front view of dump box 16 being tipped for unloading. There is shown the live floor 28 on side wall 30, the end of the baffle 38, a portion of a transfer truck RV wherein the dotted line denotes the flow of the product CM out of dump box 16. This illustrates the capability of dump box 16 to even out the flow of the crop CM. Baffle 38 keeps the depth of the crop CM getting transferred low enough that it cannot be pushed over the opposite side of the transfer truck RV, and when the crop CM is "backed up" or full, such that live wall 28 cannot transfer it laterally and outward, it stalls out on live wall 28. Because the chain slats 32 are low in profile they slide under the crop CM without damaging it. Once the crop CM has stalled out across the entire cart 10 it can be driven fore and aft along the transfer truck. Once the crop CM again has empty space in receiving vehicle RV crop material CM is again accelerated laterally as live wall 28 is again able to move the crop material CM.

A dividing wall 44 separates front and back pairs of live walls 28, and also helps transfer the weight of the crop material CM from floor 40, over to the side 30, and hence to cross braced X framework 26 on to ground engaging devices 14.

During the dumping cycle, the first, approximately one-half of the product CM is gravity fed to the truck RV for quick unload time. Thereafter, the live wall mechanism 28 moves to facilitate the movement of crop material CM so that it will fill in any open area in the transfer truck RV with a layer of crop CM that slides under baffle 38, giving quick, controlled topping-off of the transfer truck RV.

The dump cart 10 of the present invention has a very low fill side with a flexible extension 42 allowing it to drive very close to the harvester without damaging the harvesters unload boom, and it also allows the unload boom to be much lower at the start of an empty cart. A lower boom transfers crops much faster and the short drop lessens crop damage. Driving closer to the harvester also gives the unload boom a greater reach across the cart and the ability to fill a wider cart. The wide cart design relies on the crops angle of repose to give large capacity with a low fill side.

In addition, the configuration of the inventive dump cart allows for the weight of the suspended payload to be transferred back along the carrying frame to the axle through the x-bracing, giving better stability and weight distribution.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural dump cart, comprising:
   a frame;
   ground conveyance devices carrying the frame;
   a dump bed coupled to and carried by the frame, dump bed having a non-dumping position and a dumping position;
   a dumping mechanism connected to the dump bed, the dumping mechanism being configured to move the dump bed between the non-dumping position and the dumping position; and
   at least one live wall mechanism operatively located along a side of the dump bed, the live wall mechanism being generally horizontal when the dump bed is in the dumping position, the live wall mechanism including a plurality of slats coupled together such that crop material on the slats move together with the slats as the crop material is transferred from the dump bed.

2. The agricultural dump cart of claim 1, wherein the live wall mechanism further includes at least one chain that couples the slats together.

3. The agricultural dump cart of claim 2, wherein the live wall mechanism further includes a drive mechanism that selectively drives the chain.

4. The agricultural dump cart of claim 1, wherein the at least one live wall mechanism includes a first live wall mechanism and a second live wall mechanism being positioned beside each other along the side of the dump bed.

5. The agricultural dump cart of claim 4, wherein the first live wall mechanism and the second live wall mechanism are configured to move independent of each other.

6. The agricultural dump cart of claim 5, wherein as crop material is being transferred from the dump bed in the dumping position the first live wall mechanism is configured to continue moving even when the crop material in a receiving vehicle reaches a level comparable with the first live wall mechanism and the crop material stops moving to the receiving vehicle.

7. The agricultural dump cart of claim 6, wherein the second live wall mechanism is configured to allow movement of the crop material while the movement of crop material is stopped on the first live wall mechanism.

8. The agricultural dump cart of claim 1, wherein the live wall mechanism is angled outwardly relative to the dump bed when the dump bed is in the non-dumping position.

9. The agricultural dump cart of claim 1, further comprising a baffle positioned above the live wall mechanism, the baffle running substantially an entire length of the dump bed.

10. A dump bed for use with an agricultural cart, the dump bed being coupled to and carried by a frame of the agricultural cart, the dump bed having a non-dumping position and a dumping position, the dump bed comprising:
   a bottom section;
   a dumping mechanism connected to the dump bed, the dumping mechanism being configured to move the dump bed between the non-dumping position and the dumping position; and
   at least one live wall mechanism operatively located along one side of the bottom section of the dump bed, the live wall mechanism being generally horizontal when the dump bed is in the dumping position, the live wall mechanism including a plurality of slats coupled together such that crop material on the slats move together with the slats as the crop material is transferred from the dump bed.

11. The dump bed of claim 10, wherein the live wall mechanism further includes at least one chain that couples the slats together.

12. The dump bed of claim 11, wherein the live wall mechanism further includes a drive mechanism that selectively drives the chain.

13. The dump bed of claim 10, wherein the at least one live wall mechanism includes a first live wall mechanism and a second live wall mechanism being positioned beside each other along the side of the dump bed.

14. The dump bed of claim 13, wherein the first live wall mechanism and the second live wall mechanism are configured to move independent of each other.

15. The dump bed of claim 14, wherein as crop material is being transferred from the dump bed in the dumping position the first live wall mechanism is configured to continue moving as the crop material in a receiving vehicle reaches a level comparable with the first live wall mechanism and the crop material then stops being transferred to the receiving vehicle due to the comparable level of the crop material in the receiving vehicle to the crop material on the first live wall mechanism.

16. The dump bed of claim 15, wherein the second live wall mechanism is configured to allow movement of the crop material while the movement of crop material is stopped on the first live wall mechanism.

17. The dump bed of claim 10, wherein the live wall mechanism is angled outwardly relative to the dump bed when the dump bed is in the non-dumping position.

18. The dump bed of claim 10, further comprising a baffle positioned above the live wall mechanism, the baffle running substantially an entire length of the dump bed.

* * * * *